UNITED STATES PATENT OFFICE.

ROBERT M. THOMPSON, OF NEW YORK, N. Y.

PROCESS OF OBTAINING AND SEPARATING SULPHIDE OF NICKEL.

SPECIFICATION forming part of Letters Patent No. 489,576, dated January 10, 1893.

Application filed June 20, 1892. Serial No. 437,366. (No specimens.)

*To all whom it may concern:*

Be it known that I, ROBERT M. THOMPSON, a citizen of the United States, and a resident of the city, county, and State of New York, have invented certain new and useful improvements in methods or processes of obtaining sulphides of alkaline metal or ammonium for use in producing and separating sulphide of nickel and method of separating therewith, of which the following is a specification.

My invention relates to an improvement in the method or process of obtaining sulphides of alkaline metal or ammonium for use in processes for producing and separating commercially pure sulphide of nickel for use in metallurgical operations, in the treatment of mattes of copper, nickel, iron, and other metals, as the same result from the various operations of ore smelting, and more particularly to methods or processes in which the separation is effected by the addition of certain chemical re-agents, which not alone change the chemical composition of the smelted mass, but also tend to produce after smelting great fluidity in the mass, whereby the various metals or salts of metals contained therein assume upon cooling, by reason of their varying specific gravity, such relative position with reference to each other, that they may be readily separated by mechanical means, or by hand.

In two applications for Letters Patent of the United States heretofore filed by me in the United States Patent Office, as Serial Nos. 424,866, and 437,364; I have described processes for obtaining and separating sulphide of nickel from ores, mattes and other bodies in which nickel is combined with other metals, as for instance iron and copper, or either of them. When these substances containing nickel are treated with a certain class of alkalies or alkaline salts, rich in oxygen, such as carbonates of the various alkaline bases or caustic alkalies, such as potash or soda or either of them, or any of them mixed together, the combined molecule is split up, and the nickel is desulphurized and changed either into a crude metallic form, or into a sulphide differing, from that in which it existed in the ore, in chemical composition, and containing more or less sulphur, according to conditions, and the product of the smelting operation, so far as it consists of this crude nickel or nickel sulphide, will be of greater specific gravity than the other metals and may be readily separated therefrom. The changes aforesaid result from the varying affinity of the different metals for sulphur as explained in said applications.

When any of the substances above mentioned are added to a charge of matte, in a cupola, or blast furnace, in suitable quantities the caustic alkali, or carbonate, tends to absorb a portion of the sulphur from the matte, and to form a sulphide of the particular alkaline bases which are employed. In so doing it breaks up the combined molecule in which the metals exist, and takes from part of the metals the greater part of the sulphur combined in them. As under these conditions the sulphur has a less affinity for the nickel than for the other metals, a proportionately larger amount of nickel, than of the other metals is reduced to a metallic state, and when the smelted mass is tapped after smelting, from the furnace, and allowed to cool, in an ordinary cooling bed, or in any mold or slag pot, two distinct compounds will be found to have been produced, which differ in specific gravity and will assume with reference to each other the relative position of layers or strata, and which are called "tops" and "bottoms" according to their position. The "tops" so called consist of sulphide of the alkaline bases, sulphide of copper and some sulphide of iron and nickel, while the "bottoms" consist of a small amount of alkali and copper, iron and nickel in crude metallic state and perhaps a little sulphide of these metals, the proportion of the nickel owing largely in excess of the proportion of the iron and copper.

The separation of the "tops" from the "bottoms" is effected, as described in said application, while they are still liquid, by allowing the mass to settle, and then siphoning or pouring off the former in any convenient manner, for the reason that in practice the "bottoms" solidify rapidly while the "tops" remain liquid. If now the so called "bottoms" resultant from the operation or step in the separation are subjected to further treatment by again smelting or melting in any shaft or other suitable furnace, with any sulphide of an alkaline metal, or ammonium such as sulphide of soda, containing preferably an excess of free sulphuric acid, or with niter cake or salt cake as described in the second of said aforesaid applications, the metals by re-absorbing sulphur from the sulphide of soda will be reconverted into sulphides and the soda converted into caustic soda. The tendency of the sulphides thus formed is not to form a compound molecule such as existed in the original ore, or matte, but separate molecules of sulphides of the various metals present.

The copper and iron associated with the metallic nickel in the "bottoms" resultant from the first treatment with caustic alkalies or carbonates of the alkaline, bases exists either as a different sulphide from that in which it existed before, or in a lower sulphide and when the sulphide of soda is added or niter cake or salt cake are added with an excess of carbon, first the copper, then the iron and finally the nickel, take up sulphur from it, and the lower sulphides existing in the bottoms with the crude nickel are converted into full sulphides. These higher sulphides coalesce with the soda or other alkaline bases and form a mass which is very light. The lower sulphides do not so coalesce, and are precipitated to the bottom, and by repeating the operation all the lower sulphides of iron and copper are converted into higher sulphides and are thus separated from the lower sulphide of nickel. The nickel sulphide settling in the bottom may be separated by mechanical means or by hand and subjected to repeated treatment, by smelting with sulphide of soda, any number of times the iron and copper may be still further separated, and eventually a sulphide of nickel will be produced, which is commercially pure.

The present invention relates particularly to the utilizing of the by-products of the final steps of the operation of separating described in the aforesaid applications, as re-agents of fluxes in subsequent operations of similar character for the purpose of effecting a cheaper and equally efficient separation.

The "tops" resultant from the second step of the separation above referred to in the aforesaid process or from the treatment of the "bottoms" from the first step with sulphide of soda either as such, or as produced by smelting with niter or salt cake, with an excess of carbon, contain at first a large amount of caustic soda, but as the second step of separation is repeated, the "tops" will be found to contain less caustic soda, and will gradually become richer in sulphide of soda. Now I have discovered that substituting these "tops" resultant from the final separation of the nickel sulphide in previous operations, for the sulphide of the alkaline metals referred to as the re-agent or flux used in the second step of the above described process, it is possible to effect the separation equally efficiently and much more cheaply, as an economical source of supply for the sulphide of the alkaline metals or ammonium necessary to effect such second step, is thus at once provided. In order to procure "tops" suitable for use in this manner, it is sometimes necessary to eliminate a considerable proportion of the iron contained in the nickeliferous body by the ordinary smelting process, for the reason that although when such bodies containing considerable iron are trated with soda, the desired separation is effected, nevertheless the resultant "tops," will, if the soda is associated with an excess of iron not act as a proper re-agent in the subsequent treatment of other mattes.

The smelting operation may be carried out in any convenient form of furnace and the separation effected as above indicated either by siphoning off, after settling before cooling or by mechanical separation after the smelted mass has become hard. The sulphide of nickel thus separated may be subjected to further metallurgical treatment, and be reduced to metallic nickel and sold as such, or it may be converted into oxide of nickel and sold, or sold directly as sulphide, according to the purpose for which the nickel is required.

I claim as my invention:

1. The hereinbefore described method of producing a sulphide of any alkaline metal or ammonium for use in processes for producing and separating sulphide of nickel from crude nickel consisting in smelting the crude nickel in a suitable furnace with "tops" rich in a sulphide of an alkaline metal or ammonium resultant from the final separations of the sulphide of nickel in other similar operations.

2. The hereinbefore described method of producing and separating sulphide of nickel consisting in smelting the ores, or mattes containing nickel with suitable re-agents substantially as described, and in allowing the crude nickel so formed to settle, in separating the same after settling in any convenient manner and in smelting the same in a suitable furnace with tops rich in a sulphide of an alkaline metal or ammonium resultant from the final separations of the sulphide of nickel in previous similar operations, and in allowing the sulphide of nickel so formed to settle and in separating the same after cooling.

In testimony that I claim the foregoing as my invention I have signed my name, in presence of two witnesses, this 3d day of June, 1892.

ROBERT M. THOMPSON.

Witnesses:
C. VAN BRUNT,
J. W. CLARKE.